United States Patent
Lin et al.

(10) Patent No.: US 10,706,547 B2
(45) Date of Patent: Jul. 7, 2020

(54) IMAGE SEGMENTATION METHOD AND APPARATUS

(71) Applicant: HTC Corporation, Taoyuan (TW)

(72) Inventors: Cheng-Hsien Lin, Taoyuan (TW); Po-Chuan Cho, Taoyuan (TW); Hung-Yi Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 149 days.

(21) Appl. No.: 15/975,751

(22) Filed: May 9, 2018

(65) Prior Publication Data

US 2018/0350077 A1    Dec. 6, 2018

Related U.S. Application Data

(60) Provisional application No. 62/514,024, filed on Jun. 2, 2017.

(51) Int. Cl.
*G06T 7/00* (2017.01)
*G06T 7/10* (2017.01)
*G06N 3/08* (2006.01)
*G06N 3/04* (2006.01)
*G06K 9/46* (2006.01)
*G06T 7/11* (2017.01)
*G06K 9/62* (2006.01)

(52) U.S. Cl.
CPC .............. *G06T 7/10* (2017.01); *G06K 9/4628* (2013.01); *G06K 9/6274* (2013.01); *G06N 3/0454* (2013.01); *G06N 3/08* (2013.01); *G06T 7/11* (2017.01); *G06T 2207/20084* (2013.01)

(58) Field of Classification Search
CPC ... G06T 7/10; G06T 7/11; G06T 2207/20084; G06K 9/4628; G06K 9/6274; G06N 3/0454; G06N 3/08
See application file for complete search history.

(56) References Cited

U.S. PATENT DOCUMENTS

| | | | |
|---|---|---|---|
| 2017/0262705 A1* | 9/2017 | Li | G06K 9/00718 |
| 2018/0189580 A1* | 7/2018 | Lee | G06K 9/00818 |
| 2018/0285679 A1* | 10/2018 | Amitay | G06T 5/007 |
| 2018/0307984 A1* | 10/2018 | Koker | G06N 3/08 |

\* cited by examiner

*Primary Examiner* — Ping Y Hsieh
(74) *Attorney, Agent, or Firm* — CKC & Partners Co., LLC

(57) ABSTRACT

An image segmentation method for performing image segmentation through a neural network implemented by an image segmentation apparatus is provided. The image segmentation method includes the steps outlined below. Previous CNN weight data is received by a current convolution neural network unit of the neural network, wherein the previous CNN weight data is generated by a previous convolution neural network unit of the neural network based on a previous image of video data corresponding to a previous time spot. A current image of the video data corresponding to a current time spot next to the previous time spot is received by the current convolution neural network unit. Convolution is performed according to the previous CNN weight data and the current image to generate a current image segmentation result by the current convolution neural network unit.

12 Claims, 3 Drawing Sheets

IMAGE SEGMENTATION METHOD AND APPARATUS

RELATED APPLICATIONS

This application claims priority to U.S. Provisional Application Ser. No. 62/514,024, filed Jun. 2, 2017, which is herein incorporated by reference.

BACKGROUND

Field of Disclosure

The present disclosure relates to an image processing technology. More particularly, the present disclosure relates to an image segmentation method and an image segmentation apparatus.

Description of Related Art

Semantic image segmentation plays a crucial role in image understanding, allowing a computer to recognize objects in images. Recognition and delineation of objects is achieved through classification of each pixel in an image. Such processes have a wide range of applications in computer vision, in diverse and growing fields such as vehicle autonomy and medical imaging. However, current image segmentation technologies perform image segmentation respectively on different image frames of image data. As a result, the edges of the image segmentation result of the whole image data generated accordingly often have dithering phenomenon.

Accordingly, what is needed is an image segmentation method and an image segmentation apparatus to address the above issues.

SUMMARY

An aspect of the present disclosure is to provide an image segmentation method for performing image segmentation through a neural network implemented by an image segmentation apparatus. The image segmentation method includes the steps outlined below. Previous convolution neural network (CNN) weight data is received by a current convolution neural network unit of the neural network, wherein the previous CNN weight data is generated by a previous convolution neural network unit of the neural network based on a previous image of video data corresponding to a previous time spot. A current image of the video data corresponding to a current time spot next to the previous time spot is received by the current convolution neural network unit. Convolution is performed according to the previous CNN weight data and the current image to generate a current image segmentation result by the current convolution neural network unit.

Another aspect of the present disclosure is to provide an image segmentation apparatus that includes a storage unit and a processing unit. The storage unit is configured to store a plurality of computer-executable instructions. The processing unit is electrically coupled to the storage unit and is configured to retrieve and execute the computer-executable instructions to perform an image segmentation method for performing image segmentation through a neural network implemented by the processing unit when the computer-executable instructions are executed. The image segmentation method includes the steps outlined below. Previous CNN weight data is received by a current convolution neural network unit of the neural network, wherein the previous CNN weight data is generated by a previous convolution neural network unit of the neural network based on a previous image of video data corresponding to a previous time spot. A current image of the video data corresponding to a current time spot next to the previous time spot is received by the current convolution neural network unit. Convolution is performed according to the previous CNN weight data and the current image to generate a current image segmentation result by the current convolution neural network unit.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
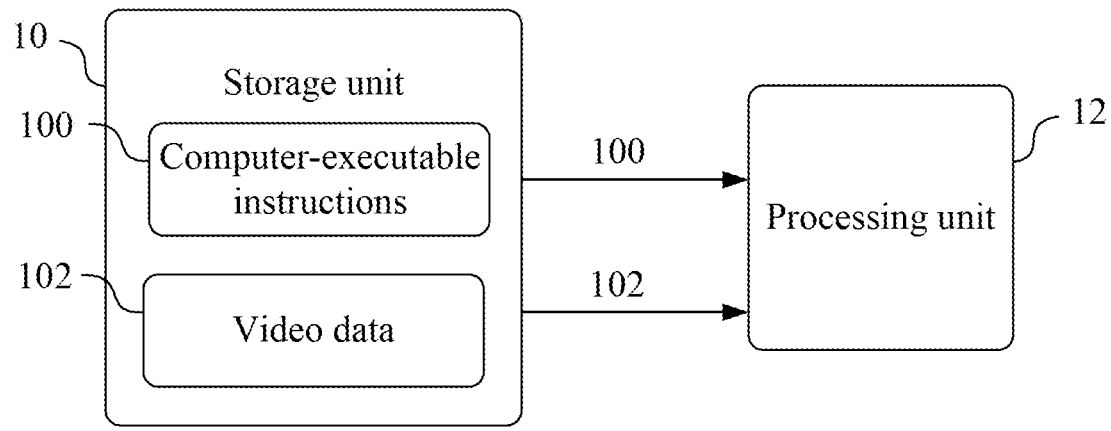
FIG. 1 is a block diagram of an image segmentation apparatus in an embodiment of the present invention.

Reference is now made to FIG. 1. FIG. 1 is a block diagram of an image segmentation apparatus 1 in an embodiment of the present invention. The image segmentation apparatus 1 includes a storage unit 10 and a processing unit 12.

In an embodiment, the storage unit 10 can be such as, but not limited to CD ROM, RAM, ROM, floppy disk, hard disk or optic magnetic disk. The storage unit 10 is configured to store a plurality of computer-executable instructions 100.

The processing unit 12 is electrically coupled to the storage unit 10. In an embodiment, the processing unit 12 is configured to retrieve and execute the computer-executable instructions 100 to perform the function of the image segmentation apparatus 1 accordingly.

More specifically, the processing unit 12 receives video data 102 to perform image segmentation on respective images in the video data 102. In an embodiment, the processing unit 12 receives the video data 102 stored in the storage unit 10, as illustrated in FIG. 1. In other embodiments, the processing unit 12 may receive the video data 102 from a remote server (not illustrated) by using such as, but not limited to a communication unit (not illustrated) through a wired or a wireless way.

Figure 2:
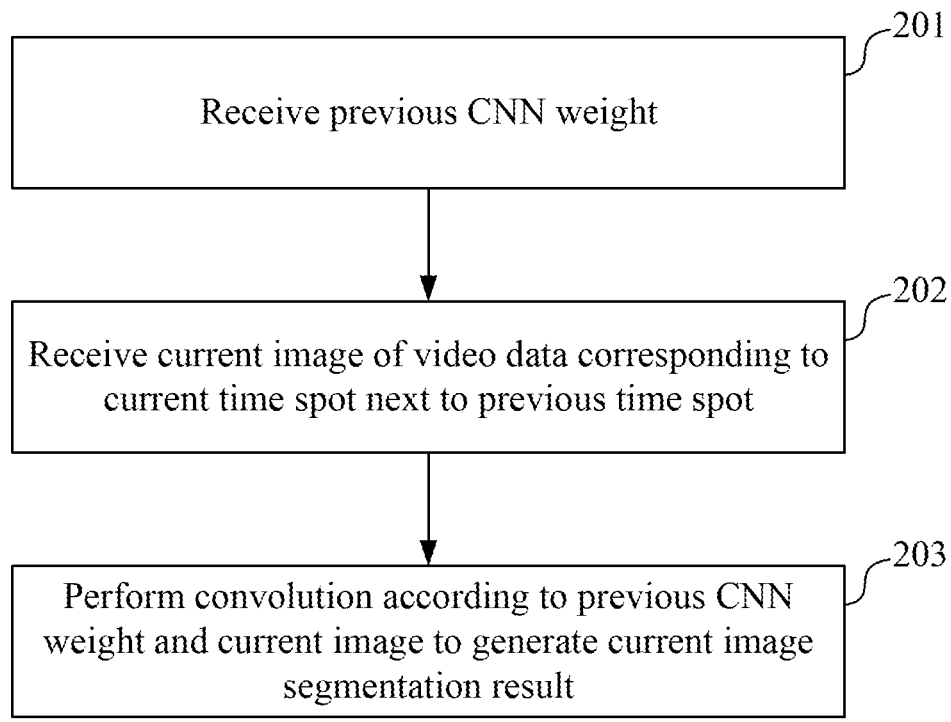
FIG. 2 is a flow chart of an image segmentation method in an embodiment of the present invention.
Figure 3:
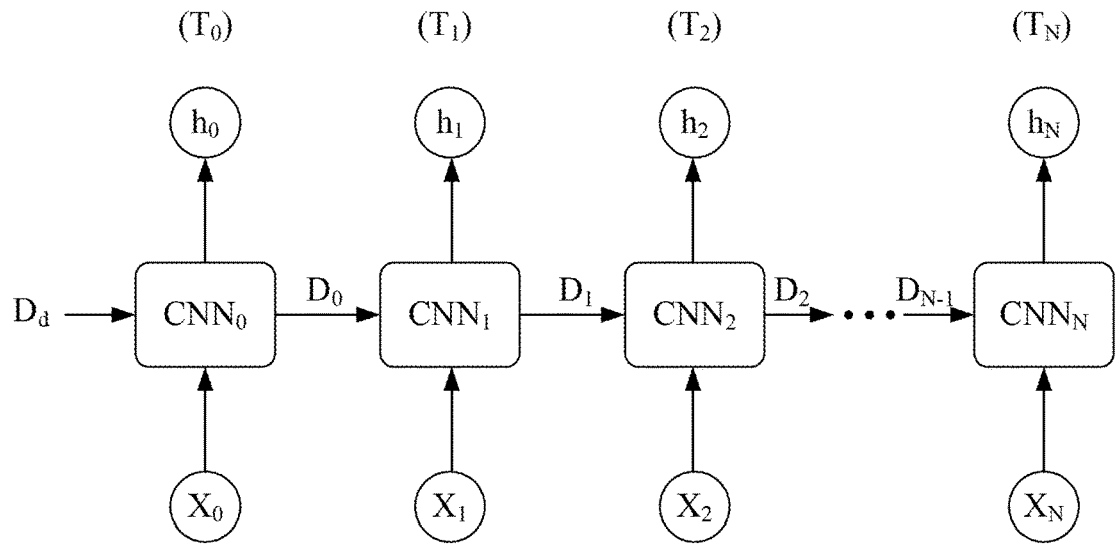
FIG. 3 is a block diagram of a neural network implemented by the image segmentation apparatus in an embodiment of the present invention.

Reference is now made to FIG. 2 and FIG. 3 at the same time. The detail of the function of the image segmentation apparatus 1 is described in the following paragraphs in accompany with FIG. 2 and FIG. 3.

FIG. 2 is a flow chart of an image segmentation method 200 in an embodiment of the present invention. The image segmentation method 200 can be used in the image segmentation apparatus 1 illustrated in FIG. 1.

FIG. 3 is a block diagram of a neural network 3 implemented by the image segmentation apparatus 1 in an embodiment of the present invention, in which the computer-executable instructions 100 operate as the neural network 3 when being executed by the processing unit 12 to perform the image segmentation method 200. In an embodiment, the neural network 3 is a recurrent neural network that includes a plurality of convolution neural network units $CNN_0$, $CNN_1$, $CNN_2$, . . . and $CNN_N$ coupled in series.

The image segmentation method 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, previous CNN weight data is received by a current convolution neural network unit.

In an embodiment, when the current convolution neural network unit is the convolution neural network unit $CNN_0$, since no previous convolution neural network unit is presented, the previous CNN weight data, i.e. CNN weight data $D_d$, is default dummy data.

When the current convolution neural network unit is one of the convolution neural network unit $CNN_1$, $CNN_2$, . . . or $CNN_N$, the previous CNN weight data is generated by a previous convolution neural network unit based on a previous image of video data, e.g. the video data 102 in FIG. 1, corresponding to a previous time spot.

For example, when the current convolution neural network unit is the convolution neural network unit $CNN_1$, the previous CNN weight data is generated by the convolution neural network unit $CNN_0$ based on the image $X_0$ of the video data corresponding to a time spot $T_0$.

In step 202, a current image of the video data corresponding to a current time spot next to the previous time spot is received by the current convolution neural network unit.

Take the convolution neural network unit $CNN_0$ as an example, when the convolution neural network unit $CNN_0$ is the current convolution neural network unit, the convolution neural network unit $CNN_0$ receives the image $X_0$ corresponding to the time spot $T_0$ as the current image. On the other hand, when the convolution neural network unit $CNN_1$ is the current convolution neural network unit, the convolution neural network unit $CNN_1$ receives the image $X_1$ corresponding to the time spot $T_1$ as the current image.

In step 203, convolution is performed according to the previous CNN weight data and the current image to generate a current image segmentation result by the current convolution neural network unit.

Take the convolution neural network unit $CNN_0$ as an example, when the convolution neural network unit $CNN_0$ is the current convolution neural network unit, the convolution neural network unit $CNN_0$ performs convolution according to the previous CNN weight data $D_d$ and the image $X_0$ to generate the image segmentation result $h_0$. On the other hand, when the convolution neural network unit $CNN_1$ is the current convolution neural network unit, the convolution neural network unit $CNN_1$ performs convolution according to the previous CNN weight data $D_1$ and the image $X_1$ to generate the image segmentation result $h_1$.

Likewise, the steps in the image segmentation method 200 can be applied to the convolution neural network units $CNN_2$, . . . and $CNN_N$ such that each of the convolution neural network units $CNN_2$, . . . and $CNN_N$ performs convolution according to the previous CNN weight data and $D_{N-1}$ and the current image $X_2$, . . . and $X_N$ corresponding to the time spots $T_2$, . . . and $T_N$ to generate the corresponding current image segmentation result $h_2$, . . . and $h_N$.

Figure 4:
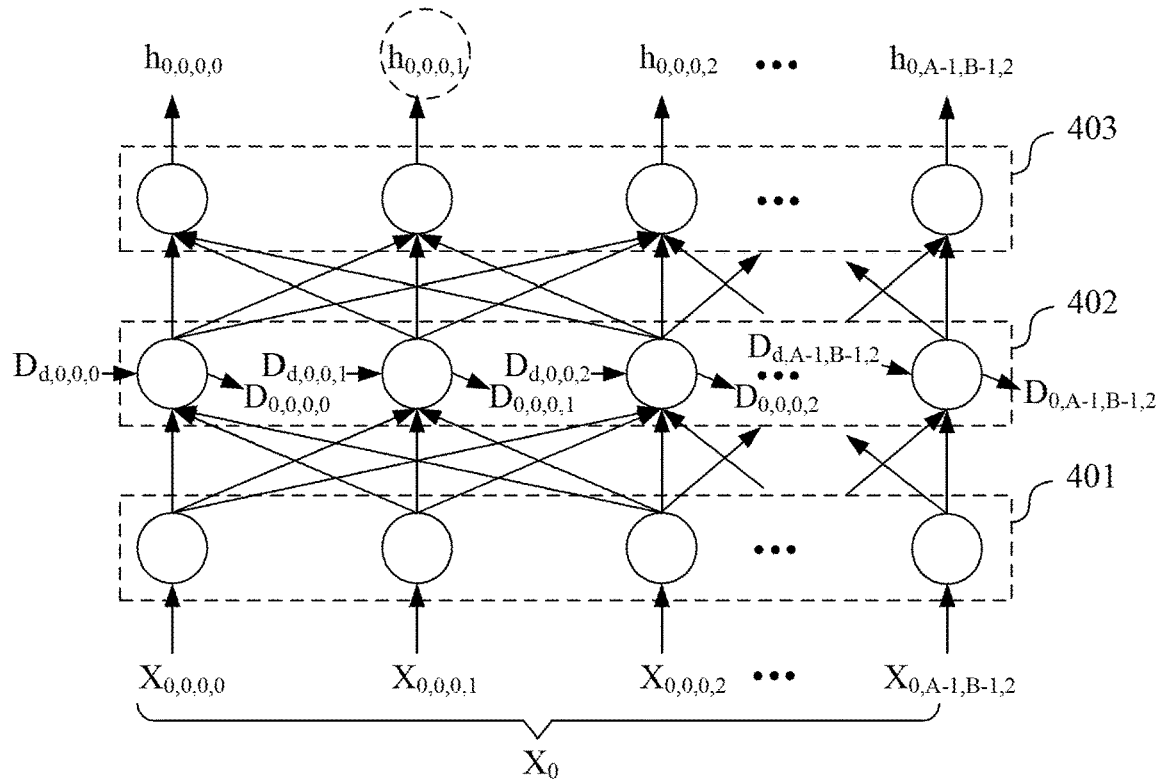
FIG. 4 is an exemplary diagram of a convolution neural network unit in an embodiment of the present invention.

Reference is now made to FIG. 4. FIG. 4 is an exemplary diagram of a convolution neural network unit 400 in an embodiment of the present invention. In an embodiment, each of the convolution neural network units $CNN_0$ $CNN_1$, $CNN_2$, . . . and $CNN_N$ illustrated in FIG. 3 can be implemented by the convolution neural network unit 400.

In an embodiment, the convolution neural network unit 400 includes an input layer 401, a hidden layer 402 and an output layer 403. In an embodiment, each of the input layer 401, the hidden layer 402 and the output layer 403 includes a plurality of computation nodes.

When the convolution neural network unit 400 is used to implement the convolution neural network unit $CNN_0$, the input layer 401 is configured to receive the image $X_0$ having such as, but not limited to a size of A×B and having three data channels, in which each pixel in the image $X_0$ includes three channels of data. For example, the pixel corresponding to the position (0, 0) has three channels of data including $X_{0,0,0,0}$, $X_{0,0,0,1}$ and $X_{0,0,0,2}$, in which the first digit of the index stands for the image, the second and the third index stand for the coordinate of the pixel and the fourth digit stands for the number of the channel.

As a result, the input layer 401 in the present embodiment includes A×B×3 of computation nodes from $X_{0,0,0,0}$, $X_{0,0,0,1}$, $X_{0,0,0,2}$, . . . , $X_{0,A-1,B-1,0}$, $X_{0,A-1,B-1,1}$ to $X_{0,A-1,B-1,2}$ receive the whole data of image $X_0$. In the present embodiment, the hidden layer 402 receives the previous CNN weight data $D_d$ having the size of A×B×3 that includes the data of $D_{d,0,0,0}$, $D_{d,0,0,1}$, $D_{d,0,0,2}$, . . . , $D_{d,A-1,B-1,0}$, $D_{d,A-1,B-1,1}$, and $D_{d,A-1,B-1,2}$ as well.

As a result, the convolution neural network unit $CNN_0$ performs convolution according to the image $X_0$ and the previous CNN weight data $D_d$ such that the output layer 403 generates computation results that include $h_{0,0,0,0}$, $h_{0,0,0,1}$, $h_{0,0,0,2}$, . . . , $h_{0,A-1,B-1,0}$, $h_{0,A-1,B-1,1}$ and $h_{0,A-1,B-1,2}$.

In an embodiment, the value of each of the computation results $h_{0,0,0,0}$, $h_{0,0,0,1}$, $h_{0,0,0,2}$, . . . , $h_{0,A-1,B-1,0}$ and $h_{0,A-1,B-1,1}$, $h_{0,A-1,B-1,2}$ represents the probability of the class of the segmented feature. As a result, for each pixel, one of the computation results, e.g. $h_{0,0,0,0}$, $h_{0,0,0,1}$, $h_{0,0,0,2}$, that has the largest value is selected to be the output of the pixel in the current image segmentation result $h_0$. For example, if the computation result $h_{0,0,0,1}$ has a value larger than the values of $h_{0,0,0,0}$ and $h_{0,0,0,2}$, the computation result $h_{0,0,0,1}$ is selected to be the output of the pixel in the current image segmentation result $h_0$.

In an embodiment, the recurrent neural network 3 illustrated in FIG. 3 is an Elman network, in which the hidden layer 402 also generates hidden layer computation results that act as the previous CNN weight data $D_0$ that includes $D_{0,0,0,0}$, $D_{0,0,0,1}$, $D_{0,0,0,2}$, . . . , $D_{d,A-1,B-1,0}$, $D_{d,A-1,B-1,1}$ and $D_{0,A-1,B-1,2}$ for the next convolution neural network unit, e.g. the convolution neural network unit $CNN_1$, such that the input layer and the hidden layer of the next convolution neural network unit respectively receive the image $X_1$ and the previous CNN weight data $D_0$ to perform convolution accordingly.

It is appreciated that number of the computation nodes of each of the input layer 401, the hidden layer 402 and the output layer 403 illustrated in FIG. 4 are merely an example. In other embodiments, the number of computation nodes can be different depending on practical applications.

Figure 5:
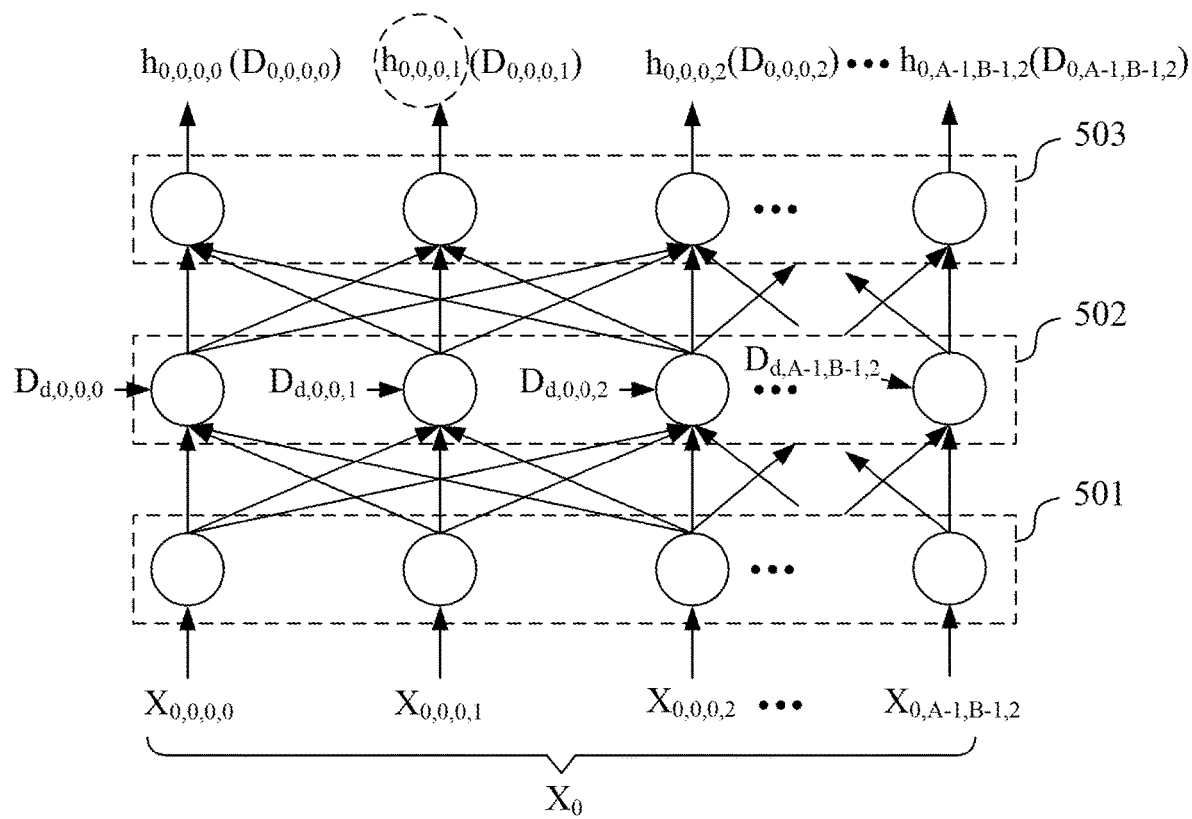
FIG. 5 is an exemplary diagram of a convolution neural network unit in an embodiment of the present invention.

Reference is now made to FIG. 5. FIG. 5 is an exemplary diagram of a convolution neural network unit 500 in an embodiment of the present invention. In an embodiment, each of the convolution neural network units $CNN_0$, $CNN_1$, $CNN_2$, . . . and $CNN_N$ illustrated in FIG. 3 can be implemented by the convolution neural network unit 500.

In an embodiment, the convolution neural network unit 500 includes an input layer 501, a hidden layer 502 and an output layer 503. In an embodiment, each of the input layer 501, the hidden layer 502 and the output layer 503 includes a plurality of computation nodes.

When the convolution neural network unit 500 is used to implement the convolution neural network unit $CNN_0$, the input layer 501 is configured to receive the image $X_0$ having such as, but not limited to a size of A×B and having three data channels, in which each pixel in the image $X_0$ includes three channels of data. For example, the pixel corresponding to the position (0, 0) has three channels of data including $X_{0,0,0,0}$, $X_{0,0,0,1}$ and $X_{0,0,0,2}$, in which the first digit of the index stands for the image, the second and the third index stand for the coordinate of the pixel and the fourth digit stands for the number of the channel.

As a result, the input layer 501 in the present embodiment includes A×B×3 of computation nodes from $X_{0,0,0,0}$, $X_{0,0,0,1}$, $X_{0,0,0,2}$, . . . , $X_{0,A-1,B-1,0}$, $X_{0,A-1,B-1,1}$ to $X_{0,A-1,B-1,2}$ receive the whole data of image $X_0$. In the present embodiment, the hidden layer 502 receives the previous CNN weight data $D_d$ having the size of A×B×3 that includes the data of $D_{d,0,0,0}$, $D_{d,0,0,1}$, $D_{d,0,0,2}$, . . . $D_{d,A-1,B-1,0}$, $D_{d,A-1,B-1,1}$, and $D_{d,A-1,B-1,2}$ as well.

As a result, the convolution neural network unit $CNN_0$ performs convolution according to the image $X_0$ and the previous CNN weight data $D_d$ such that the output layer 503 generates the computation results that include $h_{0,0,0,0}$, $h_{0,0,0,1}$, $h_{0,0,0,2}$, . . . , $h_{0,A-1,B-1,0}$, $h_{0,A-1,B-1,1}$ and $h_{0,A-1,B-1,2}$.

In an embodiment, the value of each of the computation results $h_{0,0,0,0}$, $h_{0,0,0,1}$, $h_{0,0,0,2}$, . . . , $h_{0,A-1,B-1,0}$, $h_{0,A-1,B-1,1}$, $h_{0,A-1,B-1,2}$ represents the probability of the class of the segmented feature. As a result, for each pixel, one of the computation results, e.g. $h_{0,0,0,0}$, $h_{0,0,0,2}$ that has the largest value is selected to be the output of the pixel in the current image segmentation result $h_0$. For example, if the computation result $h_{0,0,0,1}$ has a value larger than the values of $h_{0,0,0,0}$ and $h_{0,0,0,2}$, the computation result $h_{0,0,0,1}$ is selected to be the output of the pixel in the current image segmentation result $h_0$.

In an embodiment, the recurrent neural network 3 illustrated in FIG. 3 is a Jordan network, in which the computation results $h_{0,0,0,0}$, $h_{0,0,0,1}$, $h_{0,0,0,2}$, . . . , $h_{0,A-1,B-1,0}$, $h_{0,A-1,B-1,1}$ and $h_{0,A-1,B-1,2}$ generated by the output layer 503 acts as the previous CNN weight data $D_0$ that includes $D_{0,0,0,0}$, $D_{0,0,0,1}$, $D_{0,0,0,2}$, . . . , $D_{0,A-1,B-1,0}$, $D_{0,A-1,B-1}$ and $D_{0,A-1,B-1,2}$ for the next convolution neural network unit, e.g. the convolution neural network unit $CNN_1$, such that the input layer and the hidden layer of the next convolution neural network unit respectively receive the image $X_1$ and the previous CNN weight data $D_0$ to perform convolution accordingly.

It is appreciated that number of the computation nodes of each of the input layer 501, the hidden layer 502 and the output layer 503 illustrated in FIG. 5 are merely an example. In other embodiments, the number of computation nodes can be different depending on practical applications.

It is appreciated that in some embodiments, the previous CNN weight data can be fed to the input layer of the convolution neural network unit such that the convolution neural network unit performs convolution accordingly.

In the image segmentation apparatus 1 and the image segmentation method 200 of the present invention, the convolution neural network units $CNN_0$, $CNN_1$, $CNN_2$, . . . and $CNN_N$ form a recurrent neural network such that each of the convolution neural network units $CNN_0$, $CNN_1$, $CNN_2$, . . . and $CNN_N$ can perform image segmentation according to the current image corresponding to the current time spot and the previous CNN weight data corresponding to the previous time spot. The edges of the image segmentation result generated according to the method described above become smoother such that less dithering due to the time sequence information. Further, due to the presence of the time sequence information, the object that gradually changes direction can still be identified.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image segmentation method for performing image segmentation through a neural network implemented by an image segmentation apparatus comprising:
   receiving previous convolution neural network (CNN) weight data by a current convolution neural network unit of the neural network, wherein the previous CNN weight data is generated by a previous convolution neural network unit of the neural network based on a previous image of video data corresponding to a previous time spot;
   receiving a current image of the video data corresponding to a current time spot next to the previous time spot by the current convolution neural network unit;
   performing, by the current convolution neural network unit, convolution according to the previous CNN weight data and the current image to generate a current image segmentation result by selecting one of a plurality of current operation results outputted by an output layer of the current convolution neural network unit that has a largest value; and
   transmitting current CNN weight data to a next convolution neural network unit, wherein the current CNN weight data is the current operation results or current hidden layer computation results outputted by a hidden layer of the current convolution neural network unit.

2. The image segmentation method of claim 1, wherein the previous CNN weight data comprises previous output layer computation results outputted by an output layer of the previous convolution neural network unit or previous hidden layer computation results outputted by a hidden layer of the previous convolution neural network unit.

3. The image segmentation method of claim 1, further comprising:
   receiving the previous CNN weight data and the current image by an input layer of the current convolution neural network unit.

4. The image segmentation method of claim 1, further comprising:
   receiving the current image by an input layer of the current convolution neural network unit; and
   receiving the previous CNN weight data by the hidden layer of the current convolution neural network unit.

5. The image segmentation method of claim 1, wherein the neural network is a recurrent neural network comprising a plurality of convolution neural network units that comprise the previous convolution neural network unit and the current convolution neural network unit.

6. The image segmentation method of claim 1, wherein when the previous convolution neural network unit does not exist, the previous CNN weight data is default dummy data.

7. An image segmentation apparatus comprising:
a storage unit configured to store a plurality of computer-executable instructions; and
a processing unit electrically coupled to the storage unit and configured to retrieve and execute the computer-executable instructions to perform an image segmentation method for performing image segmentation through a neural network implemented by the processing unit when the computer-executable instructions are executed, wherein the image segmentation method comprises:
receiving previous CNN weight data by a current convolution neural network unit of the neural network, wherein the previous CNN weight data is generated by a previous convolution neural network unit of the neural network based on a previous image of video data corresponding to a previous time spot by the current convolution neural network unit;
receiving a current image of the video data corresponding to a current time spot next to the previous time spot by the current convolution neural network unit; and
performing, by the current convolution neural network unit, convolution according to the previous CNN weight data and the current image to generate a current image segmentation result by selecting one of a plurality of current operation results outputted by an output layer of the current convolution neural network unit that has a largest value; and
transmitting current CNN weight data to a next convolution neural network unit, wherein the current CNN weight data is the current operation results or current hidden layer computation results outputted by a hidden layer of the current convolution neural network unit.

8. The image segmentation apparatus of claim 7, wherein the previous CNN weight data comprises previous output layer computation results outputted by an output layer of the previous convolution neural network unit or previous hidden layer computation results outputted by a hidden layer of the previous convolution neural network unit.

9. The image segmentation apparatus of claim 7, wherein image segmentation method the further comprises:
receiving the previous CNN weight data and the current image by an input layer of the current convolution neural network unit.

10. The image segmentation apparatus of claim 7, wherein image segmentation method the further comprises:
receiving the current image by an input layer of the current convolution neural network unit; and
receiving the previous CNN weight data by the hidden layer of the current convolution neural network unit.

11. The image segmentation apparatus of claim 7, wherein the neural network is a recurrent neural network comprising a plurality of convolution neural network units that comprise the previous convolution neural network unit and the current convolution neural network unit.

12. The image segmentation apparatus of claim 7, wherein when the previous convolution neural network unit does not exist, the previous CNN weight data is default dummy data.

* * * * *